(12) United States Patent
Diaz Lopez

(10) Patent No.: US 9,580,026 B2
(45) Date of Patent: Feb. 28, 2017

(54) FORGERY-PROOF VEHICLE IDENTIFICATION PLATE WITH A STAMPED/ENCAPSULATED HOLOGRAM

(76) Inventor: Eduardo Diaz Lopez, Guanajuato (MX)

( * ) Notice: Subject to any disclaimer, the term of this patent is extended or adjusted under 35 U.S.C. 154(b) by 0 days.

(21) Appl. No.: 13/501,855

(22) PCT Filed: Oct. 14, 2010

(86) PCT No.: PCT/MX2010/000111
§ 371 (c)(1),
(2), (4) Date: Apr. 13, 2012

(87) PCT Pub. No.: WO2011/046420
PCT Pub. Date: Apr. 21, 2011

(65) Prior Publication Data
US 2012/0198737 A1  Aug. 9, 2012

(30) Foreign Application Priority Data

Oct. 14, 2009  (MX) .................. MX/u/2009/000396

(51) Int. Cl.
*G09F 3/02* (2006.01)
*B60R 13/10* (2006.01)
*G03H 1/00* (2006.01)
*G03H 1/02* (2006.01)

(52) U.S. Cl.
CPC ............. *B60R 13/10* (2013.01); *G03H 1/0011* (2013.01); *G03H 1/0244* (2013.01); *G03H 2270/13* (2013.01); *G09F 3/02* (2013.01)

(58) Field of Classification Search
CPC .......... B60R 13/105; B60R 13/10; G09F 7/18; G09F 2007/1895
USPC ..................................................... 40/201–203
See application file for complete search history.

(56) References Cited

U.S. PATENT DOCUMENTS

| | | | | |
|---|---|---|---|---|
| 4,368,979 A | * | 1/1983 | Ruell | 356/71 |
| 5,672,381 A | * | 9/1997 | Rajan | 427/198 |
| 6,979,487 B2 | * | 12/2005 | Scarbrough et al. | 428/195.1 |
| 2009/0193694 A1 | * | 8/2009 | Cordell et al. | 40/201 |
| 2011/0265358 A1 | * | 11/2011 | Beenken et al. | 40/200 |

FOREIGN PATENT DOCUMENTS

EP            717389  A1 *  6/1996

\* cited by examiner

*Primary Examiner* — Cassandra Davis
(74) *Attorney, Agent, or Firm* — Hoglund & Pamias, PSC; Roberto J. Rios

(57) ABSTRACT

The invention relates to an automobile metal plate for identifying a vehicle, said plate comprising a metal base, a reflective material, an encapsulated hologram that can be hot- or cold-stamped, and a laminating material which forms a single integral body comprising the reflective material, the hologram and the actual laminate. The structure of said vehicle identification plate prevents the encapsulated hologram from being modified in any way. The encapsulated hologram cannot be detached or erased or altered by any physical or chemical means.

7 Claims, 1 Drawing Sheet

FORGERY-PROOF VEHICLE IDENTIFICATION PLATE WITH A STAMPED/ENCAPSULATED HOLOGRAM

BACKGROUND AND FIELD OF THE INVENTION

The present utility model refers to the field of inviolable security elements protection and more specifically, to the application of a stamped-encapsulated hologram between a substrate and a protective laminating material, used in the vehicle identification plates manufacture; the stamped-encapsulated hologram cannot be altered, modified or extracted from the plate without damaging permanently the plate and the stamped-encapsulated hologram.

For a very long time, it has been desirable to obtain a product that avoids the vehicle identification plates be forged or altered. In such attempts, it is desirable to evidence any purpose for altering the plate whether by means of the total or partial destruction of the plate and/or the sample of the violation attempt to the vehicle identification plate.

U.S. Pat. Nos. 5,370,763 and 5,595,624 refer to methods to manufacture informative articles with violation evidence. These patents disclose an article covered with a writing-resistant transparent tape, such as silicone resin. In the present invention, the articles formed and the method to produce such articles do not use a silicone resin; instead, to encapsulate the stamped hologram, using a material made of transparent polyester film or a varnish, or alike; that may be elongated and that no deformations are suffered in the vehicle identification plates manufacturing steps (cut of plates, embossing, dyeing and furnace-cooking process of alpha-numerical characters, etc.). U.S. Pat. No. 5,948,555 describes a forgery-proof vehicle validation of the type that is inserted in a hole of a vehicle identification plate. As a consequence of the differential adhesive properties provided between the layers of the article, any effort to separate them produces the integral destruction of the information included. An additional embodiment related to vehicles sales is described in the U.S. application Ser. No. 08/854,717. Unlike the present invention, there is no series of layers on the stamped hologram that is desirable to be protected.

U.S. Pat. No. 5,763,052 refers to an article that provides information and to an associated method to such article that has a separation control material placed on a portion of the article surface; where the article surface may be a metal. Also comprises a layer on which the information is placed that is placed on at least a portion of the separation control material and besides a portion of the surface. The layer receiving the information is adapted to receive information thereon. A transparent adhesive tape is bonded to the layer receiving information and which already contains said information. The transparent tape solidly adheres to the information-containing layer, that the layer receiving the information does to the separation control material. As a result thereof, withdrawal of the information-receiving layer of the article withdraws so much the information-receiving layer as well as the information that is found on the separation control material, in this manner forgery to the article will be visible easily. The present invention does not use a peeling-off transparent tape and neither allows the separation of any layer, neither adhesive exists in the manufactured article.

From the above, there is a need of a vehicle identification plate or similar articles that avoids forgery and/or alteration of the contained information therein, such information to be protected is found in a stamped-encapsulated hologram adhered to this plate.

One of the objects of the present invention is to provide an article which contains information, through the stamped-encapsulated hologram, that be forgery-proof, and cannot be modified or altered in any way.

An additional object of the present invention, is to provide a vehicle identification plate that comprises a stamped-encapsulated hologram with contained information therein, where the stamped hologram is encapsulated through a protective laminator, of the film-type or varnish.

BRIEF DESCRIPTION OF THE DRAWINGS

The FIG. 1 is a frontal view of a vehicle identification plate.

The FIG. 2 is a perspective view of the plate that schematically shows the plate with its different components.

Figure 1:
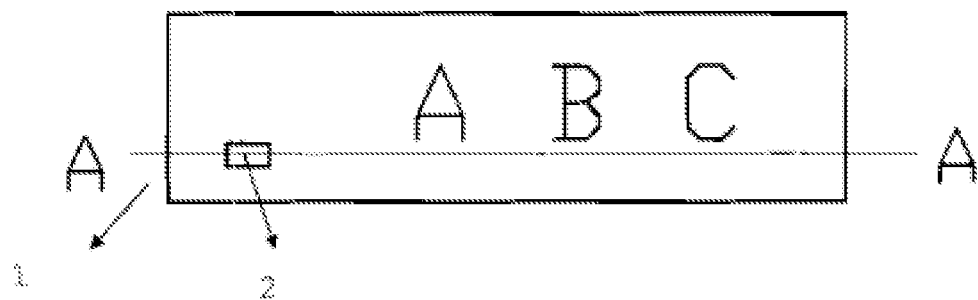
Figure 2:
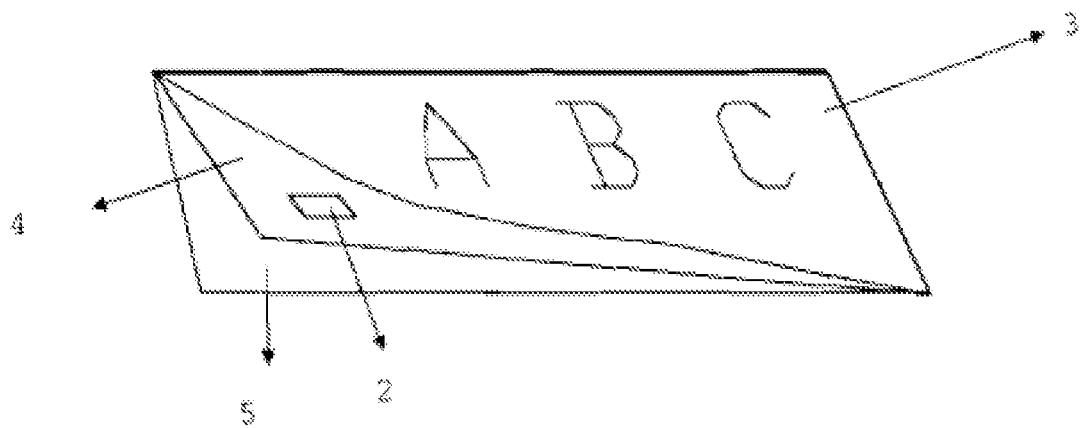
Figure 3:
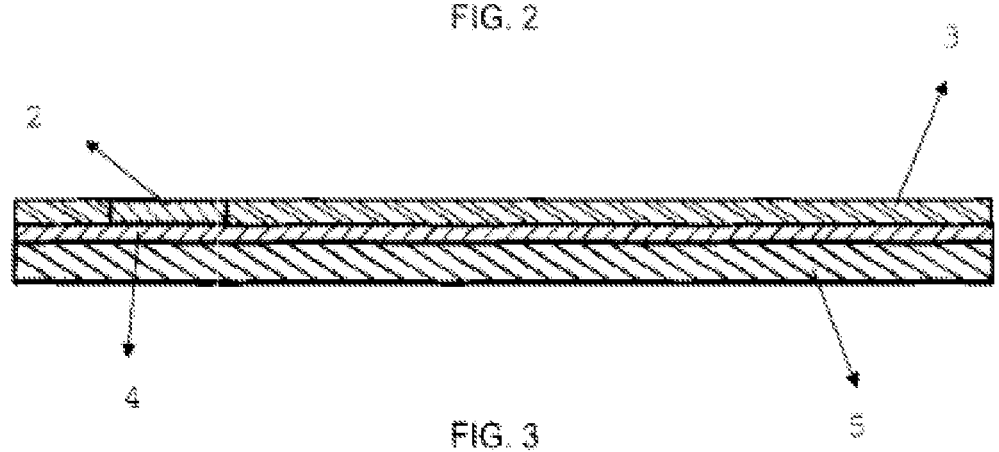

The FIG. 3 is a cross sectional view taken along the line A-A of FIG. 1.

DETAILED DESCRIPTION OF THE INVENTION

The present invention refers to a vehicle identification plate (1) that comprises a security element (2) protected by an element (3) that provides the characteristic of avoiding that the stamped-encapsulated hologram be removed or altered. The stamped-encapsulated hologram or simply the hologram, is placed on a substrate (4) which, in the preferred embodiment, is a reflecting material. The substrate (4) at the same time joins to a base (5) such as a metal plate for a vehicle identification plate, in order to form a vehicle identification plate (1) with a forgery-proof security element (2).

As reflecting material, it is understood all that material used in the field of printing graphic processes for vehicle identification plates and may be one of vinyl, polyester, polypropylene, polyurethane and combinations thereof.

The material used for the stamped-encapsulated hologram, in the preferred embodiment is polyester, since it is a material that supports relatively higher temperatures than labels or decals.

The polyester stamped-encapsulated hologram (2), that contains the information, is found encapsulated by a protective laminator (3), of the film-type (described in the preferred embodiment) or varnish which avoids degradation thereof during the subsequent phases in the process of the vehicle identification plate (1) manufacturing, processes such as: cut of plates, embossing, dyeing and heat treatment or furnace-cooking of alpha-numerical characters, etc. These elements may exist or not in the final article disclosed in the preferred embodiment by the vehicle identification plate.

The laminator is a material that has the particularity to be bond so that it forms a single body with the stamped hologram and therefore with the substrate, this is, with the reflecting material. This laminator in the most preferred application is a film-type material, even it may also adopt the form of a liquid or sprayable material or combinations thereof. The vehicle identification plate is resistant to chemical product attacks, degradation by the effect of environmental heat and of the sunlight, such as alcohol, kerosene, detergents, and other solvents with or without frictions.

Since the laminator will bond permanently to the stamped-encapsulated hologram, an intent of physical alteration just as excessive scrapping or chemical attack will conduct necessarily to the destruction of the stamped-encapsulated hologram, since the laminator will bond permanently to the stamped-encapsulated hologram and, therefore, to the vehicle identification plate. An attempt of alteration through chemical products would produce the destruction of the laminator, upon the laminator being destroyed, the stamped-encapsulated hologram would be destroyed, since both elements merge in one alone.

The laminator shows a high chemical and mechanical resistance, reason by which it may not be dissolved neither to be removed from the stamped-encapsulated hologram or from the base material or substrate nor from the vehicle identification plate unless it is destroyed entirely.

The base material, whether reflecting material or of any other type, may include or not printed graphics such as figures, letters or combinations thereof.

The application of the stamped-encapsulated hologram, can be carried out for registration or through a longitudinal or cross strip of the vehicle identification plate as required, although the application for registration is preferred.

The elaboration process of the vehicle identification plates is common as known in the state of the art. Nevertheless, it includes the following additional steps:

after applying the hologram to the substrate, by means of a process of cold or hot stamping, to bond the substrate to the vehicle identification plate; and To apply a laminator or protective field on the substrate; once the laminator is placed, the corresponding steps are continued, such as: cut of plates, embossing (if applicable) dyeing (if applicable) and furnace-cooking of alpha-numerical characters (if applicable), etc.

The term stamped-encapsulated hologram means an hologram that has been stamped through any known process in the middle, such as hot or cold-stamped on a substrate; and that besides has been encapsulated or encircled by the laminator and by the substrate and this encapsulation is able to support the environmental conditions and work process of identification plates, without visibly altering color, shine and consistency features of the vehicle identification plates in general, and particularly, stamped to the plate or article that is built.

The exemplary article of the present utility model is a vehicle identification plate that comprises a metal base, a substrate formed by a reflecting material (or of any another type), a stamped-encapsulated hologram and a laminating material. The vehicle identification plate comprises graphics or images and diverse legends printing (if applicable) on the substrate; such as vehicle identification numbers, whether embossed or not, painted or inked or not and furnace-cooked or not. The vehicle identification plate in which, when printing exists, is carried out by any known system, such as rotogravure, flexography, offset, silkscreening (serigraphy), digital and alike.

An important characteristic of this vehicle identification plate, as has been mentioned, that the hologram is attached to the substrate and to the laminator in such a way that upon concluding the production process, there is formed a single entity where separation cannot be achieved unless the vehicle identification plate is destroyed totally or partially wherein the hologram is located. The term "destroyed" refers to the ruining of the vehicle identification plate for the purposes of providing a forgery proof vehicle identification plate.

The invention claimed is:

1. A forgery-proof vehicle identification plate that comprising:
    (a) a metal base plate;
    (b) a continuous substrate adhered to said metal base plate, said substrate being formed of a reflecting material;
    (c) a laminate layer adhered to an upper surface of said substrate, said laminate layer being a transparent film;
    (d) a hologram located over the substrate and embedded within the laminate layer.

2. The vehicle identification plate according to claim 1, wherein said hologram is a stamped hologram.

3. The vehicle identification plate according to claim 1, wherein the laminate layer has a set of indicia formed thereon selected from the group consisting of: printed graphics, embossed indicia or alpha-numerical characters, painted indicia and dyed indicia.

4. The vehicle identification plate according to claim 3, wherein the laminated layer and the hologram are resistant to chemical products attacks and degradation by the effects of environmental heat and sunlight.

5. The vehicle identification plate according to claim 1, wherein the substrate reflecting material is made of at least one material selected from the group consisting of: vinyls, polyesters, polypropylenes, and polyurethanes.

6. The vehicle identification plate according to claim 5, wherein the hologram itself is encapsulated between the laminate layer and the substrate.

7. The forgery-proof vehicle identification plate, according to claim 5 including printed indicia formed by a process selected from the group consisting of: Rotogravure, flexography, offset, silkscreening and digital.

* * * * *